United States Patent [19]

Olender

[11] 4,310,200
[45] Jan. 12, 1982

[54] DRIVE AXLE TRUSS ASSEMBLY

[76] Inventor: James P. Olender, 1348 Hart Lake Dr., Gaylord, Mich. 49735

[21] Appl. No.: 104,873

[22] Filed: Dec. 18, 1979

[51] Int. Cl.$^3$ .............................................. B60B 35/16
[52] U.S. Cl. ........................................ 301/129; 74/607
[58] Field of Search ................... 301/129, 130, 124 H; 180/DIG. 1, 271, 69.1; 403/391, 399, 398; 74/607

[56] References Cited

U.S. PATENT DOCUMENTS

| | | | |
|---|---|---|---|
| 462,181 | 10/1891 | Van Allen | 301/129 |
| 609,925 | 8/1898 | Arnold | 301/129 |
| 744,116 | 11/1903 | Schneider | 301/129 |
| 1,120,933 | 12/1914 | Groves | 301/129 |
| 1,153,996 | 9/1915 | Brocksmith | 301/129 |
| 1,255,490 | 2/1918 | Vehstedt | 301/129 |
| 1,299,732 | 4/1919 | Kelly | 301/129 |
| 2,735,501 | 2/1956 | Loyd | 301/129 |
| 3,095,242 | 6/1963 | Van der Wilt | 301/129 |

Primary Examiner—Charles A. Marmor
Attorney, Agent, or Firm—Gifford, VanOphem, Sheridan & Sprinkle

[57] ABSTRACT

A truss assembly is provided for the drive axle of an automotive vehicle in which the drive axle includes a differential having a pair of axle housings extending laterally outwardly from opposite sides of the differential and in which a drive wheel is connected to the free end of the axle mounted in each axle housing. The truss assembly comprises a first truss member which is rigidly secured to one of the axle housings and, similarly, a second truss member which is rigidly secured to the other axle housing. One end of each truss member is positioned adjacent the axle differential. An elongated bar is rigidly secured at one end to one of the truss members at its end adjacent the differential and extends toward the other truss member underneath the axle differential and so that a mid portion of the bar abuts along the bottom of the differential. The opposite end of the bar is externally threaded and positioned through an opening in the other truss member at its end adjacent the differential. Thereafter, a nut threadedly engages the threaded end of the bar so that, upon tightening the nut, the bar is longitudinally tensioned. This tension, in turn, is applied to the axle housings and thus resists undesirable upward flexing of the axle housings with respect to the differential.

6 Claims, 5 Drawing Figures

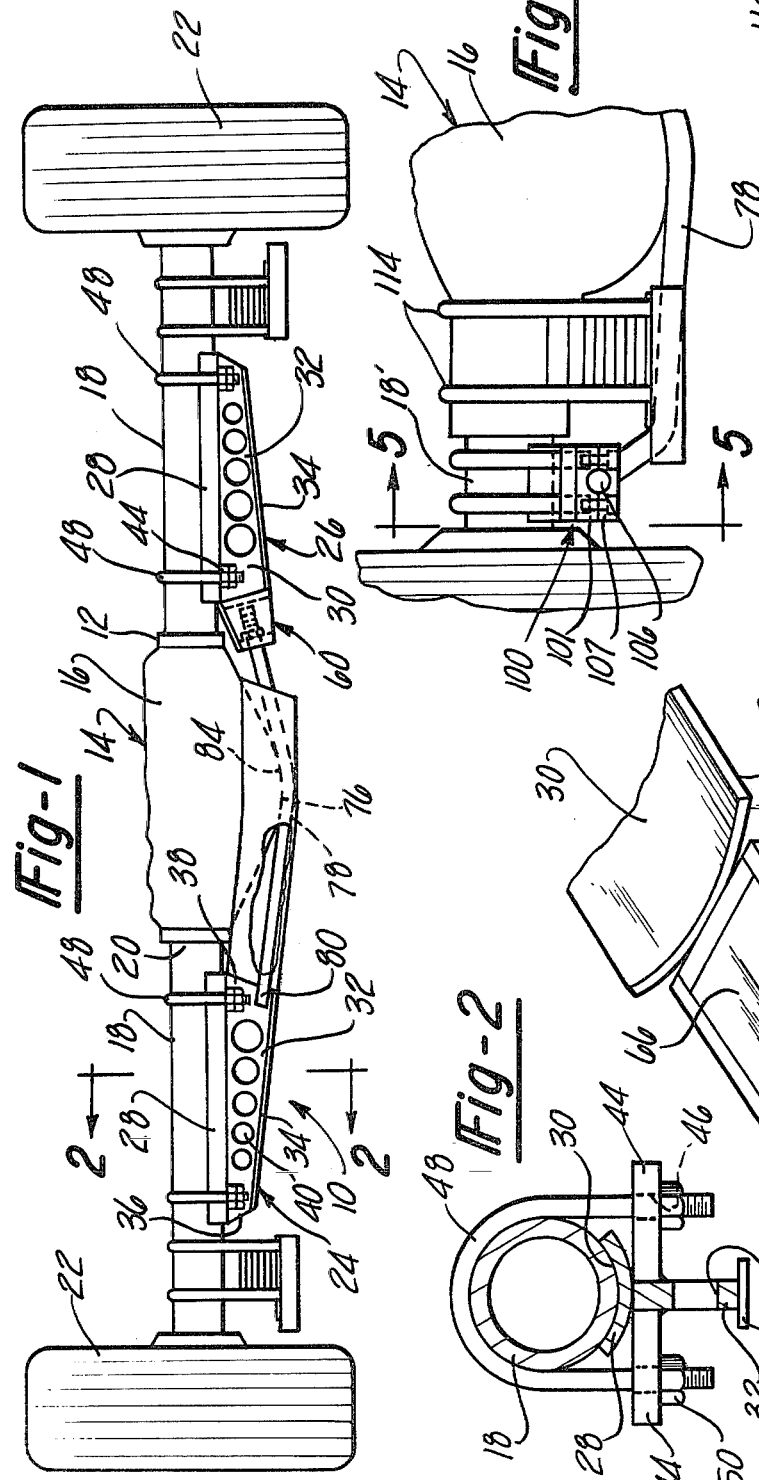
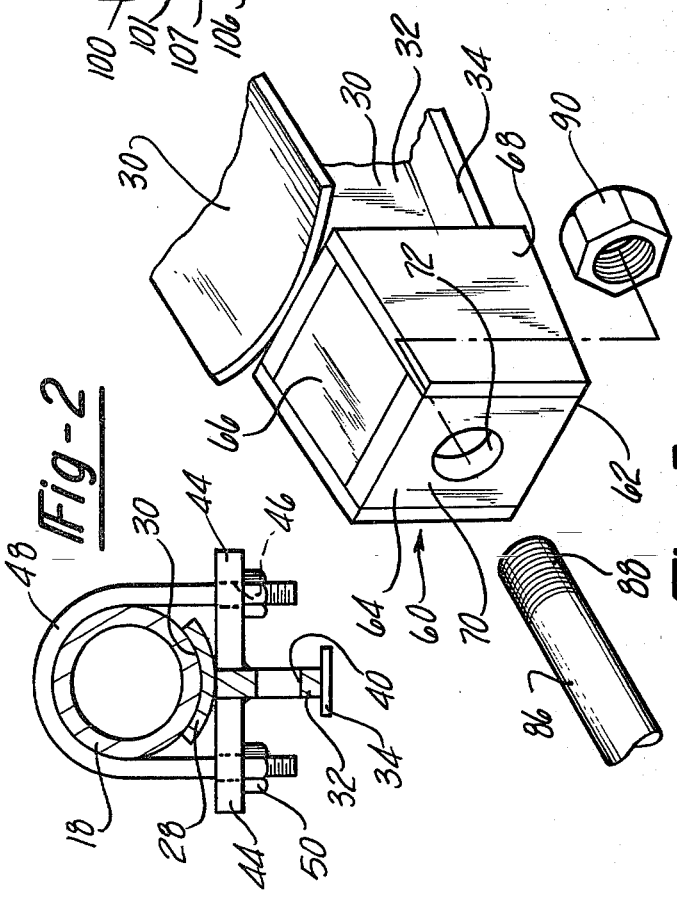
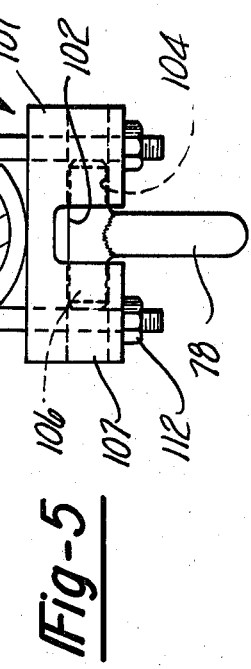

DRIVE AXLE TRUSS ASSEMBLY

BACKGROUND OF THE INVENTION

I. Field of the Invention

The present invention relates generally to truss assemblies and, more particularly, to a truss assembly for the drive axle of an automotive vehicle.

II. Description of the Prior Art

Many types of recreational vehicles, such as jeeps and similar vehicles, employ a four wheel drive system. Consequently, the front axle assembly for such vehicles includes a differential assembly having a pair of elongated axle housings which extend laterally out from opposite sides of the differential. A drive axle, of course, is carried in each axle housing and a wheel is drivingly connected to the free end of each axle.

The axle housings are typically tubular and cylindrical in cross-sectional shape and are secured to the differential housing by welding. The welded connection between the axle housings and the differential forms a relatively weak spot in the construction of the front wheel drive for the vehicle.

Recreational vehicles, by their very nature, are often driven in off road conditions where the terrain is extremely uneven. In many cases, such vehicles are driven over small hills so that the entire vehicle becomes airborne before it again contacts the ground.

Such driving conditions, however, can be particularly damaging to the front wheel drive assembly for the vehicle. In particular, when the vehicle's front wheels become airborne and again contact the ground, the downward force of the vehicle tends to bend and flex the axle housings upwardly with respect to the differential and such flexing can break the welded connection between the axle housing and the differential. Although similar stresses are also imposed upon the rear axle drive assembly, the problem of breakage of the axle housing is particularly acute for the front axle assembly since the weight of the vehicle engine is positioned directly above the front axle.

In order to reduce the occurrence of axle breakage, there have been a number of previously known truss assemblies which attach to both the front and rear drive axles for such vehicles and which are designed to minimize the flexing of the axle housings with respect to the differential. These previously known truss assemblies, however, have not proven entirely satisfactory in operation.

One type of previously known axle truss assembly comprises a pair of clamps and each clamp is secured to the axle housing adjacent one of the wheels. Thereafter, an elongated rod is secured at one end to one clamp and, at its other end, to the other clamp and so that a mid portion of the rod contacts the problem of the differential housing. In operation, the additional strength of the rod secured across the axle assembly is intended to add rigidity to the axle assembly and minimize upward bending of the axle housings with respect to the differential.

This previously known type of axle truss assembly, however, is not proven entirely satisfactory in operation. One disadvantage of this previously known truss assembly is that the clamp provides only a single point connection between the rod and each axle housing thus only marginally reduces the stresses imposed upon the axle housing during off road operation of the vehicle. Moreover, these previously known truss assemblies have employed relatively small diameter rods, for example, a one-half inch diameter rod, and since the rod extends substantially entirely across the axle assembly, such rods only minimumly add to the overall strength of the axle assembly. For this reason, the breakage of the drive axle assembly particularly between the axle housing and the differential housing is a common event even when these previously known truss assemblies are employed.

These previously known truss assemblies are further disadvantageous in that the bar stretches after the prolonged use thus reducing the axle support provided by the truss assembly.

SUMMARY OF THE PRESENT INVENTION

The present invention provides an improved truss assembly for the drive axle of an automotive vehicle and is particularly suited for the front drive axle of a four wheel drive recreational vehicle.

In brief, the truss assembly according to the present invention comprises a pair of truss members wherein one truss member is secured to each axle and extends laterally outward from the differential housing. In the preferred form of the invention and within the space limitations of the drive axle assembly, each truss member is preferably elongated and has a channel member with a surface which substantially conforms to the outer and lower periphery of the axle housing. The truss member is then secured to the axle housing by clamps at longitudinally spaced points along the axle housing so that each truss member is secured to and supports its respective axle housing along a substantial length of the axle housing rather than the single point connection of the previously known truss assemblies.

An elongated bar is then rigidly secured, such as by welding, to one of the truss members at its end adjacent the differential housing. The bar then extends towards the other truss member and underneath the differential housing so that a mid portion of the bar abuts along the bottom of the differential housing. The opposite end of the bar is positioned through an opening in a box which is welded to the other truss member at its end adjacent the axle differential. In addition, this other end of the bar is externally threaded. The box has at least one side open through which a nut is inserted and threaded onto the bar. Upon tightening the nut, the tension between the truss members can be varied as desired. As the longitudinal tension on the bar increases, the support provided by the truss assembly against upward flexing movement of the axle housings with respect to the differential housing also likewise increases.

In the preferred form of the invention, one end of each truss member is positioned closely adjacent the differential housing and the bar is secured to these ends of the truss members. Consequently, the total length of the bar is only slightly greater than the width of the differential housing thus minimizing any stretching of the bar. However, even in the event that the bar does become stretched after prolonged use, the tension along the bar can be increased to its desired level by merely retightening the nut.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is a front view showing the truss assembly according to the present invention secured to a drive axle of a vehicle;

FIG. 2 is a sectional view taken substantially along line 2—2 in FIG. 1;

FIG. 3 is a perspective view illustrating one portion of the truss assembly according to the present invention;

FIG. 4 is a fragmentary front view showing a modification of the truss assembly according to the present invention; and FIG. 5 is a fragmentary sectional view taken substantially along line 5—5 in FIG. 4.

DETAILED DESCRIPTION OF PREFERRED EMBODIMENTS OF THE PRESENT INVENTION

With reference first to FIG. 1, the truss assembly 10 according to the present invention is thereshown secured to a drive axle 12 of an automotive vehicle. The drive axle 12 can be either a front or rear drive axle and, in the conventional fashion, includes a differential 14 having a differential housing 16 and a pair of elongated tubular cylindrical axle housings 18 extending laterally outwardly from opposite sides of the differential housing 16. The axle housings 18 typically are secured to the differential housing 16 by welds 20 and are of a relatively thin wall construction. One drive axle (not shown) extends through each axle housing 18 and is attached to the vehicle wheel 22.

Referring now to FIGS. 1 and 2, the truss assembly 10 of the present invention further comprises a first truss member 24 and a second truss member 26 in the embodiment shown in FIG. 1. The first truss member 24 includes an elongated and arcuately shaped channel member 28 having a surface 30 which substantially conforms to the outer periphery of the axle housing along its lower end. An elongated reenforcing rib 32 is secured along and depends downwardly from the channel member 30 and terminates at its lower end in an elongated and transversely extending flange 34. The channel 28 together with the rib 32 and lower flange 34 together form a modified I beam in which the upper flange of the I beam is in the form of the arcuately shaped channel member. In addition, the reenforcing rib 32 is tapered thus having a narrow end 36 and a wide end 38. If desired, openings 40 can be provided through the support member 24 in order to reduce the weight of the first truss member 24 without unduly interfering with its overall strength.

As best shown in FIG. 2, a pair of longitudinally spaced tabs 44 are secured to both sides of and underneath the channel member 28 by welds or other suitable means. In addition, each tab 44 protrudes laterally outwardly from each side of the channel member 28 and has an aperture 46 formed through it for a reason to be shortly described.

The first truss member 24 is positioned against one of the axle housings 18 so that the surface 30 of the channel member 28 flatly abuts against the axle housing 18 and so that the relatively wide end 38 of the rib 36 is positioned adjacent the differential housing 16. The first truss member 18 is then secured to the axle housing 18 by a pair of longitudinally spaced U clamps 48 extending over the axle housing 18 and so that each clamp 48 has its free ends positioned through the apertures 46 in one of the pair of tabs 44. Suitable nuts 50 engage the free ends of the U clamps 48 and, upon tightening, rigidly secure the first truss member 24 to the axle housing 18 and so that the rib 32 depends downwardly from the axle housing 18.

The second truss member 26 is similar in construction to the first truss member 24 and, as such, includes the channel member 28 having the arcuate surface 30 which substantially conforms in shape to the other axle housing 18. A tapered reenforcing rib 32 is secured longitudinally along the channel member 30 and depends downwardly from it while, as before, a lower transverse flange 34 is secured along the lower edge of the support member 38. Like the first truss member 24, the second truss member 26 is secured to the other axle housing 18 by the U bolts 48 extending through the apertures 46 in the outwardly protruding tabs 44 at at least two longitudinally spaced positions along the channel members 30. The second truss member 26 is also secured to the second axle housing 18 so that the relatively wide end 38 of the rib 32 is positioned adjacent the other side of the differential housing 16.

With reference to FIG. 3, unlike the first truss member 24, however, the second truss member 26 has a box 60 rigidly secured to the end of the truss member 26 adjacent the differential housing 16. The box is secured to the second truss member 26 preferably by welding the box 60 to the second channel member 30, the reenforcing rib 32 and also to the lower flange 34 of the second truss member 36 so that the box 60 is rigidly and fixedly secured to the second truss member 26. The box 60 preferably is open only through its lower end 62 and, as such, includes a side plate 64, top plate 66, front plate 68 and rear plate 70. An aperture 72 is formed through the side plate 64 for a reason to be subsequently described. In addition, the box 60 is angled downwardly (FIG. 1) with respect to the axis of the axle housing 18 so that the aperture 72 in the box side plate 64 is directed toward the bottom 76 of the differential housing 16.

Referring now to FIGS. 1 and 3, an elongated bar 78 is secured at one end 80 to the first truss member 24 by any suitable means, such as welding, so that the end 80 of the bar 78 is fixedly secured to the first truss member 24 at the end of the truss member 24 adjacent the differential housing 16. The bar 78 extends toward the second truss member 26 and so that a mid portion 84 of the bar 78 abuts against the lower end 76 of the differential housing 16. The opposite end 86 (FIG. 3) of the bar 78 is positioned through the aperture 72 in the box 60 and is externally threaded as shown at 88. This second end 86 of the bar 78 is longitudinally adjustably secured to the second truss member 26 by a nut 90 so that the longitudinal tension on the bar 78 can be easily and simply varied by merely tightening or loosening the nut 90 as desired. Access to the nut 90, of course, is obtained through the lower open end 62 of the box 60. Moreover, due to the abutment between the mid portion 84 of the bar 78 and bottom of the differential housing, as the bar 78 is tensioned by tightening the nut 90, the truss assembly 10 effectively prevents upward flexing of the axle housings 18 with respect to the differential housing 16 even when a large and sharp upward force is applied to the wheels 22 of the vehicle such as when the vehicle is used in off road conditions.

From the foregoing it should be apparent that the truss assembly according to the present invention is advantageous in several different respects. First, since the truss members 24 and 26 support their respective axle housings 18 along substantially the entire length of the axle housings 18, in contrast to the previously known truss bars. Moreover, since the inner ends of the truss members 24 and 26 are positioned closely adjacent the differential housing 16, the bar 78 extends only a relatively short distance between the truss members 24 and 26, i.e. a distance only somewhat greater than the width of the differential housing 16. Thus, stretching of the bar 78 is minimized. Moreover, even in the event of the bar 78 becoming somewhat stretched after extended usage, the bar tension can be easily increased by merely tightening the nut 90.

With reference now to FIGS. 4 and 5, in some types of axle drive assemblies, the differential 14 and the differential housing 16 are positioned closely adjacent one of the drive wheels so that there is insufficient room to position the first truss member 24 across the relatively short axle housing 18'. In this case, the first truss member 28 is replaced by a modified truss member 100 comprising a first plate 101 which abuts along the bottom of the short axle housing and includes both a laterally extending channel 102 and a longitudinally extending channel 104. The first end 80 of the elongated bar 78 is also modified into the form of a T fitting 106 which is positioned within the channels 102 and 104. Thereafter, a lower plate 107 having registering channels 108 and 110 is positioned over the lower end of the plate 100 and so that the T fitting 106 on the bar 78 is entrapped between the upper plate 101 and lower plate 107. The plates 101 and 107 are then secured to the short axle housing 18' by a pair of U clamps 114 extending around the short axle housing 18' and through receiving apertures in the plates 101 and 107. Suitable nuts 112 engage the U bolts 110 to secure the plates 101 and 107 together.

From the foregoing it can be seen that the truss assembly 10 according to the present provides an improved truss support for the drive axle of a vehicle. Although the truss assembly 10 can be used on either the front or rear drive axle of a vehicle, it has been found to have particular utility for the front drive axle of an off-road recreational vehicle since the front drive axle is subjected to greater strain than the rear axle when driven in off road conditions due to the weight of the engine above the front drive axle.

It will be understood, of course, that the exact construction of the truss members 24 and 26 may vary in dependence upon the construction of the drive axle itself. In addition, if desired, a skid plate can be secured to the bar 78 so that the skid plate is positioned around and protects the axle differential 14.

Having described my invention, however, many modifications thereto will become apparent to those skilled in the art to which it pertains without deviation from the spirit of the invention as defined by the scope of the appended claims.

I claim:

1. A truss assembly for a drive axle of a vehicle, said drive axle having a lower side which faces a ground surface, said drive axle having a differential and a pair of axle housings extending laterally outwardly from opposite sides of the differential and a suspension spring attached to each axle housing, said truss assembly comprising:

a first elongated truss member, said first truss member comprising a first elongated channel member having a surface which substantially conforms to and abuts against the lower surface of one axle housing along substantially the entire length of said one axle housing between the differential and its suspension spring, a first elongated reinforcing rib longitudinally secured to said first channel member so that said rib depends downwardly toward the ground surface, means for securing said first truss member to said one axle housing comprising at least two longitudinally spaced clamps disposed around said one axle housing and secured to said first truss member, a second elongated truss member, said second truss member comprising a second elongated channel member having a surface which substantially conforms to and abuts against the lower surface of the other axle housing along substantially the entire length of said other axle housing between the differential and its suspension spring, a second elongated reinforcing rib longitudinally secured to said second channel member so that said rib depends downwardly toward the ground surface, means for securing said second truss member to said one axle housing comprising at least two longitudinally spaced clamps disposed around the other axle housing and secured to said second truss member, an elongated bar fixedly secured at one end to the end of the first truss member adjacent the differential and extending underneath said differential toward said second truss member, said bar being positioned so that a midpoint of the bar abuts along the bottom of the differential, and means for longitudinally adjustably securing the other end of the bar to the end of the second truss member adjacent the differential whereby the tension on said bar can be varied.

2. The invention as defined in claim 1 wherein said other end of the bar is externally threaded and extends through an aperture in the second truss member and wherein said means for longitudinally adjustably securing the other end of the bar to the second truss member comprises a nut which threadably engages the other end of the bar.

3. The invention as defined in claim 1 wherein said second truss member further comprises a box secured to the end of the rib adjacent said differential, said box having at least one side open, and said other end of said bar extending into the interior of the box.

4. The invention as defined in claim 3 wherein the bottom side of said box is open.

5. The invention as defined in claim 1 and including a skid plate secured to said bar and positioned around the bottom of at least a portion of said differential.

6. The invention as defined in claim 1 wherein each reinforcing rib includes a plurality of openings formed through it.

* * * * *